United States Patent
Viljamaa et al.

(10) Patent No.: US 11,115,447 B2
(45) Date of Patent: Sep. 7, 2021

(54) VIDEO ON DEMAND LOAD EQUALIZATION

(71) Applicant: NOKIA SOLUTIONS AND NETWORKS OY, Espoo (FI)

(72) Inventors: Janne Petteri Viljamaa, Vantaa (FI); Hannu Vaitovirta, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/971,767

(22) PCT Filed: Feb. 27, 2018

(86) PCT No.: PCT/EP2018/054780
§ 371 (c)(1),
(2) Date: Aug. 21, 2020

(87) PCT Pub. No.: WO2019/166071
PCT Pub. Date: Sep. 6, 2019

(65) Prior Publication Data
US 2020/0396270 A1    Dec. 17, 2020

(51) Int. Cl.
*H04L 29/06*    (2006.01)
*H04N 21/238*    (2011.01)
*H04N 21/643*    (2011.01)

(52) U.S. Cl.
CPC ........ *H04L 65/4084* (2013.01); *H04L 65/601* (2013.01); *H04N 21/23805* (2013.01); *H04N 21/64322* (2013.01)

(58) Field of Classification Search
CPC .............. H04L 65/4084; H04L 65/601; H04N 21/23805; H04N 21/64322; H04N 21/2385

(Continued)

(56) References Cited

U.S. PATENT DOCUMENTS

| 7,103,668 B1 * | 9/2006 | Corley | H04L 29/06027 709/231 |
| 2005/0289618 A1 * | 12/2005 | Hardin | H04L 47/70 725/95 |

(Continued)

FOREIGN PATENT DOCUMENTS

| CN | 104285492 A | 1/2015 |
| GB | 2 342 263 A | 4/2000 |

OTHER PUBLICATIONS

International Search Report and Written Opinion dated Oct. 22, 2018 corresponding to International Patent Application No. PCT/EP2018/054780.

(Continued)

*Primary Examiner* — Tan Doan
(74) *Attorney, Agent, or Firm* — Squire Patton Boggs (US) LLP

(57) ABSTRACT

According to an aspect, there is provided a network node for performing video on demand equalization. Upon receiving downlink traffic to be transmitted to one or more terminal devices, the network node detects a VOD stream from the downlink traffic. The network node determines the number of VOD streams handled by the cell and a first traffic load and compares the number of the VOD streams and the first traffic load to a first and a second threshold. In response to the number of the VOD streams being above the first threshold or the first traffic load being above the second threshold, the network node selects a terminal device associated with one of the VOD streams, selects a target cell from available cells and schedules the terminal device to use the target cell for said one of the VOD streams.

12 Claims, 12 Drawing Sheets

(58) Field of Classification Search
USPC .......................................................... 709/231
See application file for complete search history.

(56) References Cited

U.S. PATENT DOCUMENTS

| 2013/0242777 | A1* | 9/2013 | Choi ................ | H04W 72/0446 |
| | | | | 370/252 |
| 2017/0118677 | A1* | 4/2017 | Axelsson .............. | H04W 36/22 |
| 2018/0278533 | A1* | 9/2018 | Li ......................... | H04L 43/026 |

OTHER PUBLICATIONS

Notification of Transmittal of the International Preliminary Report on Patentability and International Preliminary Report on Patentability dated May 7, 2020 corresponding to International Patent Application No. PCT/EP2018/054780.

Chinese Office Action corresponding to CN Application No. 201880090235.0, dated Mar. 9, 2021.

* cited by examiner

VIDEO ON DEMAND LOAD EQUALIZATION

FIELD OF THE INVENTION

Various example embodiments relate generally to managing traffic load at a network node, and more particularly to performing Video-On-Demand-related load equalization at a network node.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The popularity of Video On Demand (VOD) services such as YouTube, Netflix and Amazon Prime has been increasing rapidly in recent years which has caused an increasing load on mobile networks. In the future, Video On Demand traffic load will likely continue to grow due to the introduction of new high quality (4 k and beyond) video streams. As Video On Demand services utilize non-guaranteed bit rate (non-GBR) radio bearers for the data transmission between access nodes and terminal devices, satisfying bandwidth resources for high quality Video On Demand service in highly loaded cell is often demanding. When bandwidth of a non-GBR radio bearer which carries Video On Demand service stream is restricted, a reduction in video playback quality (resolution, frames per second) or even buffering may result leading to a degradation of the end user experience.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, an apparatus, and a computer program as defined in the independent claims. Further embodiments of the invention are disclosed in the dependent claims.

BRIEF DESCRIPTION OF THE DRAWINGS

In the following, some example embodiments will be described with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
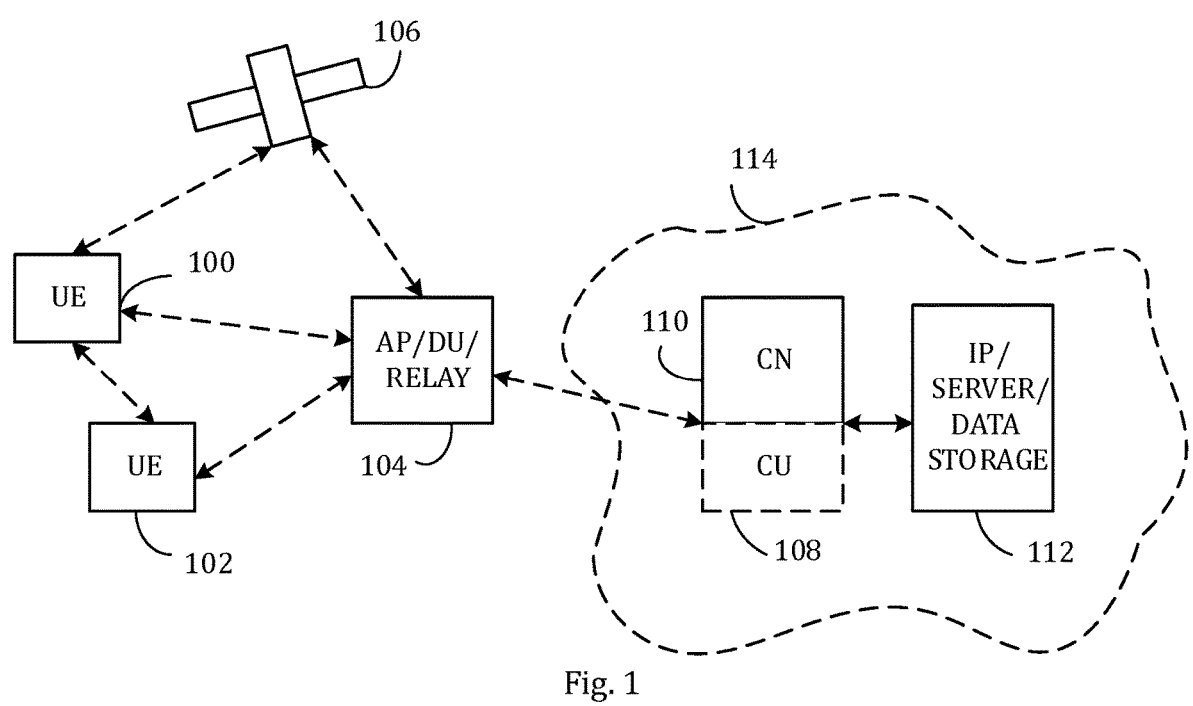
FIGS. 1 and 2 illustrate examples of communications systems to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

The user devices 100, 102 may comprise one or more carrier aggregation capable user devices and/or one or more carrier aggregation incapable user device.

Various techniques described herein may also be applied to a cyber-physical system (CPS) (a system of collaborating computational elements controlling physical entities). CPS may enable the implementation and exploitation of massive amounts of interconnected ICT (information and communications technology) devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablet computers and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The element 112 may comprise one or more servers providing content for one or more Video On Demand (VOD) streaming services (e.g., YouTube, Netflix, Amazon Prime and HBO) accessible by the user devices 100, 102. Said VOD streaming services are services which allow users (of the user devices 100, 102) to select and watch to video content when they choose to, rather than having to watch at a specific broadcast time. Some VOD streaming services may also allow streaming of audio content. Typically, the content which is streamed by the user is constantly received by the user device and presented to the user, as opposed to downloading the whole content (e.g., a movie) to the user device before presenting said content to the user. The element 112 may further comprise a Domain Name System (DNS).

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)NodeBs, includes, in addition to Home (e/g)NodeBs (H(e/g)nodeBs), a home NodeB gateway, or HNB-GW (not shown in FIG. 1). A HNB Gateway (HNB-GW), which is typically installed within an operator's network may aggregate traffic from a large number of HNBs back to a core network.

Figure 2:
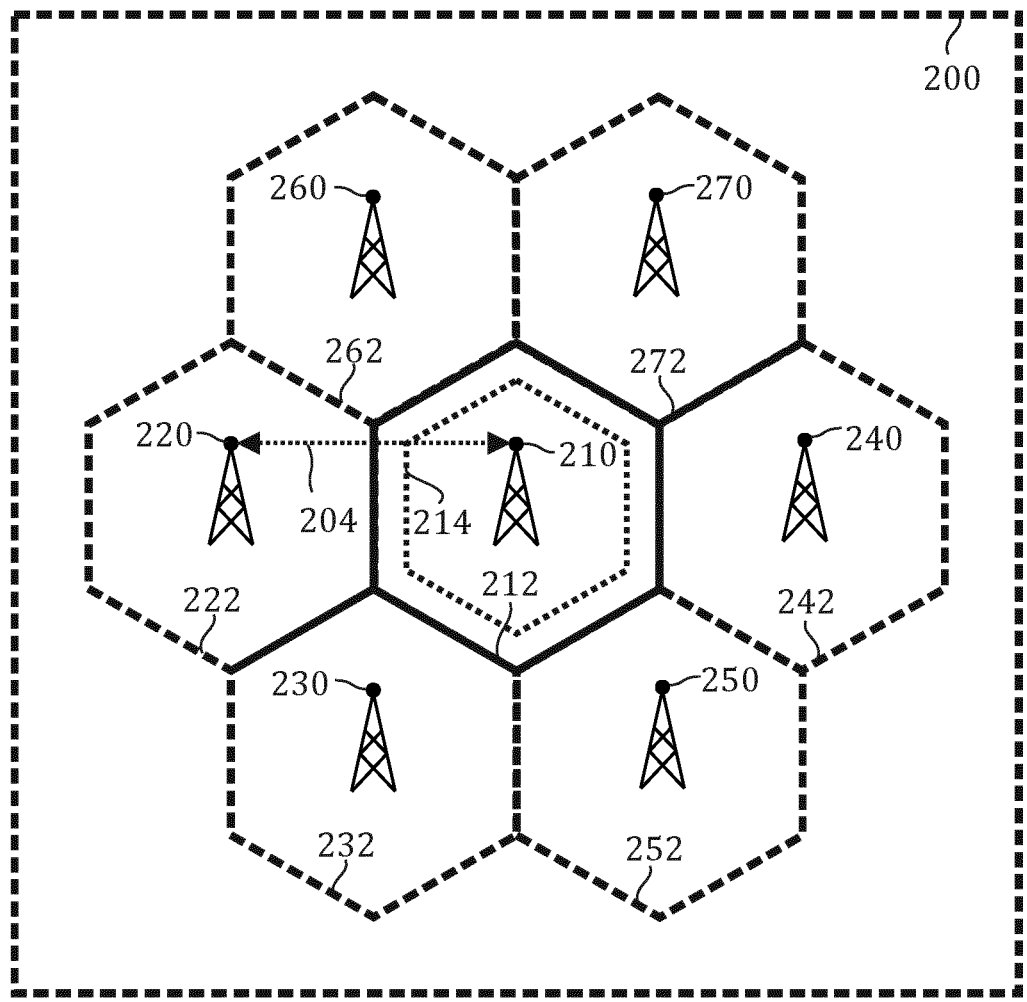

FIG. 2 depicts another example of a simplified communications system architecture 200 only showing some elements and functional entities, all being logical units, whose implementation may differ from what is shown. The connections shown in FIG. 2 are logical connections; the actual physical connections may be different. It is apparent to a person skilled in the art that the system typically comprises also other functions and structures than those shown in FIG. 2.

Specifically, FIG. 2 illustrates a communications system 200 in which an access node 210 (a source access node, a network node or a source network node) providing a cell 212 is surrounded by neighbouring access nodes 220, 230, 240, 250, 260, 270 (neighbouring network nodes) providing neighbouring cells 222, 232, 242, 252, 262, 272. From the point of view of the access node 210 acting as a source access node for traffic load equalization, the neighbouring access nodes 220, 230, 240, 250, 260, 270 may be considered potential target access nodes. The access node 210 may be connected to the neighbouring access nodes 220, 230, 240, 250, 260, 270 via interfaces 204 (only one of which is shown in FIG. 2). Similarly, each neighbouring access node 220, 230, 240, 250, 260, 270 may connected to its neighbouring access nodes via interfaces 204. Said interfaces 204 may be, for example, X2 interfaces. While in the illustrated example the access node 210 has six neighbouring network nodes, it should be appreciated that the number of neighbouring access nodes for a particular access node is not limited to this number.

In some embodiments, one or more of the access node 210 and the neighbouring access nodes 220, 230, 240, 250, 260, 270 may be capable of carrier aggregation. Access nodes supporting carrier aggregation may utilize multiple component carriers having different frequency bands and thus may provide multiple cells (or layers), namely a primary cell and one or more secondary cells. The different cells may have different coverages due to differing pathloss. The primary and secondary cells may correspond to primary and secondary cell (PCell and SCell) as defined by 3GPP. In FIG. 2, the source access node 210 may be capable of carrier aggregation with the cell 212 corresponding to the primary cell and the cell 214 corresponding to one of the one or more secondary cells. The access node 210 and any of its neighbouring access nodes 220, 230, 240, 250, 260, 270 may correspond to the access node 104 of FIG. 1 as described above. One or more terminal devices (not shown in FIG. 2) may be located in each cell 222, 232, 242, 252, 262, 272. Any of said one or more terminal devices may correspond to any of user devices 100, 102 of FIG. 1.

The cells 212, 214, 222, 232, 242, 252, 262, 272 may comprise one or more small cells (e.g., micro, femto, or pico cells) and/or macro cells. In some scenarios, one or more local area access nodes may be arranged within a control area of a macro cell access node. The local area access node may provide wireless access within a sub cell that may be comprised within a macro cell. Typically, the sub cell provides a hot spot within the macro cell. The operation of the local area access node may be controlled by an access node under whose control area the sub cell is provided. In some scenarios, a plurality of local area access nodes may be controlled by a single macro cell access node.

Figure 3:
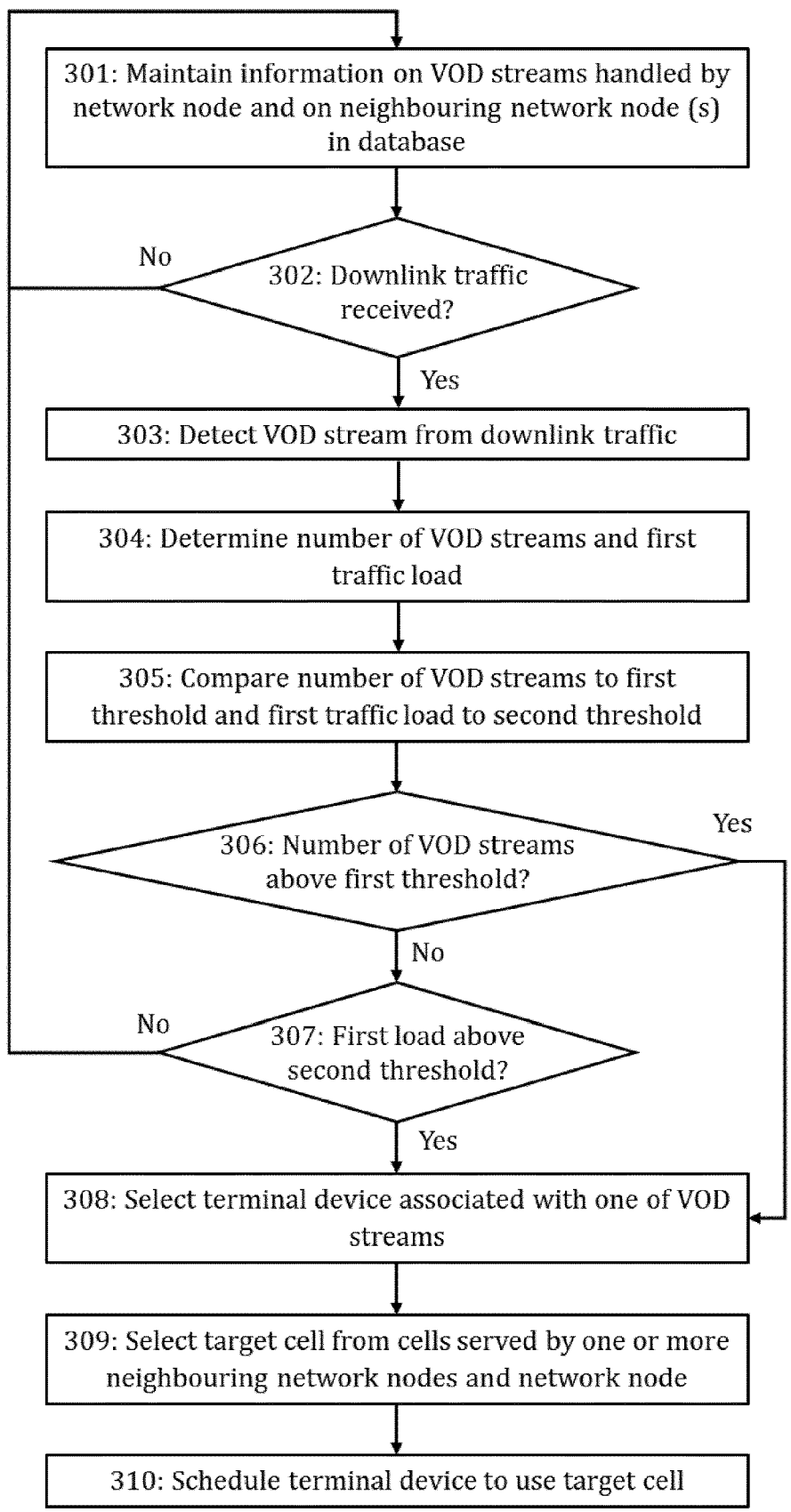
FIGS. 3, 4A, 4B, 5, 6, 7A, 7B, 7C and 8 illustrate examples of processes according to embodiments.

FIG. 3 illustrates a process executed by a network node for traffic load equalization to reduce the Video On Demand (VOD) load at the network node. Said network node may be equally called a source network node. The network node executing the process may be the access node 104 of FIG. 1 and/or the access node 210 of FIG. 2. The process of FIG. 3 may be repeated periodically or performed continuously.

Referring to FIG. 3, the network node maintains, in block 301, in a database information on VOD streams handled by the network node and information on one or more neighbouring network nodes. The VOD streams handled by the network node may correspond specifically to active VOD streams. The information on VOD streams handled by the network node may comprise, for example, information on the number of VOD streams handled by the network node (that is, each cell of the network node) and IP addresses, domain names and traffic loads pertaining to said VOD streams. The information on the one or more neighbouring network nodes may comprise similar information for the one or more neighbouring network nodes as well as information on the properties and specifications of the neighbouring network nodes themselves. Some of the information on the one or more neighbouring network nodes may be transmitted by the one or more neighbouring network nodes and/or by the core network periodically to the network node.

The network node receives, in block 302, downlink traffic to be transmitted to one or more terminal devices served by the network node. In other words, the network node detects at least one incoming downlink data packet. This action may be performed continuously by the network node. The received downlink traffic may comprise one or more VOD streams received from one or more server of VOD service providers, but it may also comprise other streaming or non-streaming traffic. The network node detects, in block 303, a VOD stream from the downlink traffic to be transmitted to a terminal device in a cell served by the network node. The detected VOD stream may be specifically a new VOD stream, that is, not a known VOD stream which is active or is resuming activity after a period of inactivity. An exemplary embodiment for performing the detecting is discussed in relation to FIG. 6.

The network node determines, in block 304, at least the number of VOD streams handled by the cell (i.e., the cell associated with the detected VOD stream) including the detected VOD stream and a first traffic load caused by said VOD streams. Said VOD streams may correspond specifically to active VOD streams (though including also the detected VOD stream). In general, a traffic load (or simply a load) of the network node or of a cell served by a network node may be defined in terms of usage of different resources with respect to their available limits. For example, said resources may comprise total transmitted and/or received power, interference in a cell, cell throughput in downlink and/or uplink, increase in blocking and/or handover failure rate. Moreover, any of said resources may be considered for all received and/or transmitted traffic or for certain subsection of it, e.g., downlink traffic due to VOD streaming and uplink/downlink non-GBR/GBR traffic. The first traffic load may be defined to be dependent only on the downlink traffic caused by said VOD streams at the network node or by all non-GBR traffic while a second traffic load (to be discussed later) may be used to take into account all the downlink traffic (both GBR and non-GBR traffic). The first and second traffic loads may be defined separately for each cell served by the network node (if more than one cell is served by the network node).

The network node compares, in block 305, the number of the VOD streams to a first threshold and the first traffic load to a second threshold. The first threshold may have an integer value while the second threshold may be defined as any positive real number corresponding to a definition of the first traffic load. If the number of the VOD streams is equal to or below the first threshold in block 306 and the first traffic load is equal to or below the second threshold in block 307, the network node may handle (schedule) the detected VOD stream itself (assumed here to be a separate process and thus not shown in FIG. 3) and therefore no rescheduling using another cell is necessary. If the number of the VOD streams is above the first threshold in block 306 or the first traffic load is above the second threshold in block 307, the network node selects, in block 308, a terminal device associated with one of the VOD streams (and thus located in the cell associated with the detected VOD stream) and selects, in block 309, a target cell from one or more cells. Said one or more cells comprise a cell or cells served by at least one network node of the one or more neighbouring network nodes and the network node. Then, the network node schedules, in block 310, the terminal device to use the target cell for said one of the VOD streams. The selected terminal device may be associated with the VOD stream detected in block 303 or it may be associated with some other VOD stream depending, for example, on the resources consumed by each VOD stream. The selection of the target cell may depend, for example, on the number of VOD streams handled by each cell of each neighbouring network node and the corresponding first traffic loads. In some embodiments, the selected target cell may be another (secondary) cell served by the source network node or even the original cell associated with the VOD stream if no better alternative is available. Selection of the terminal device and the target cell is discussed in relation to later embodiments in more detail.

Figure 4A:
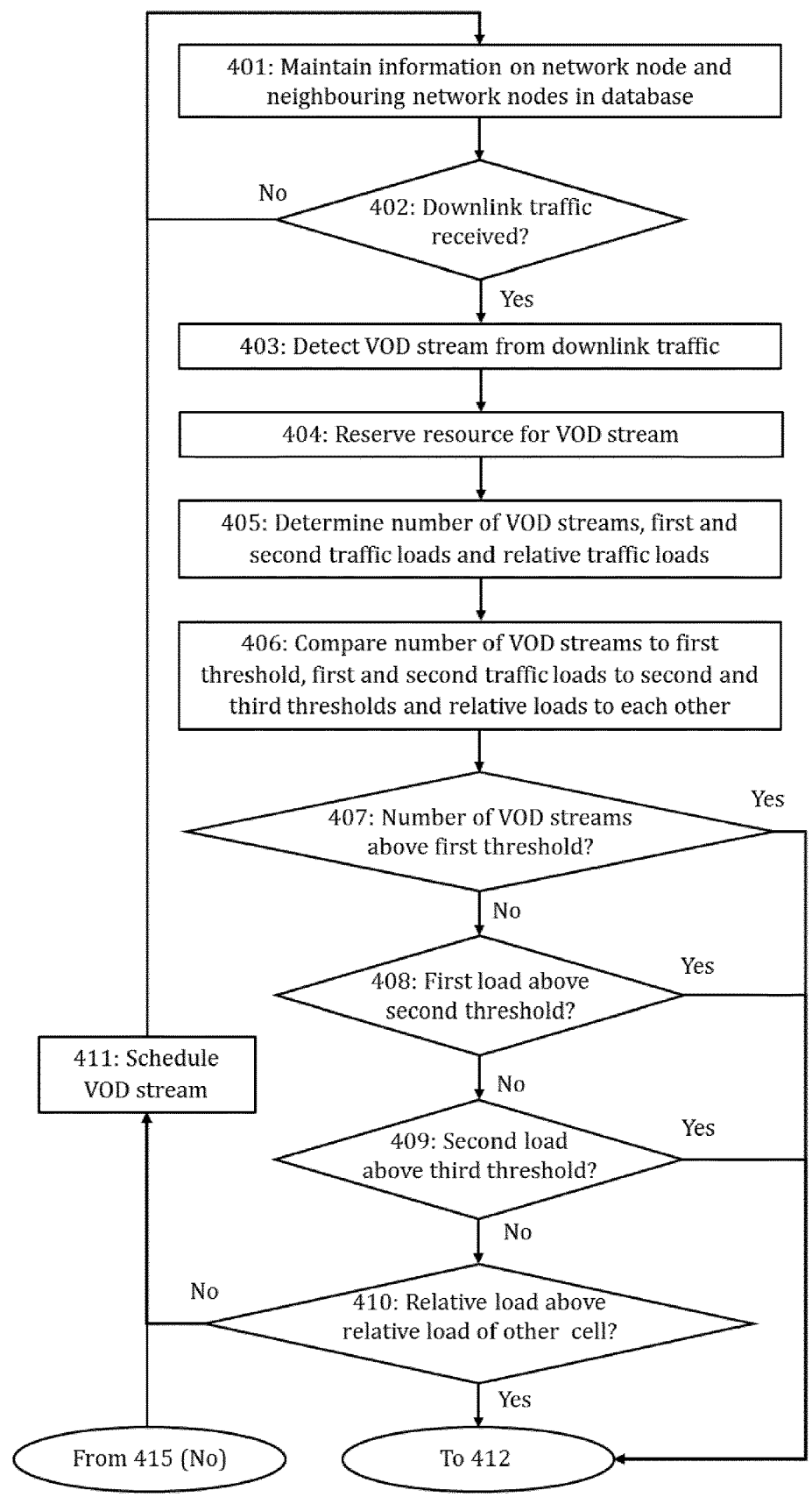
Figure 4B:
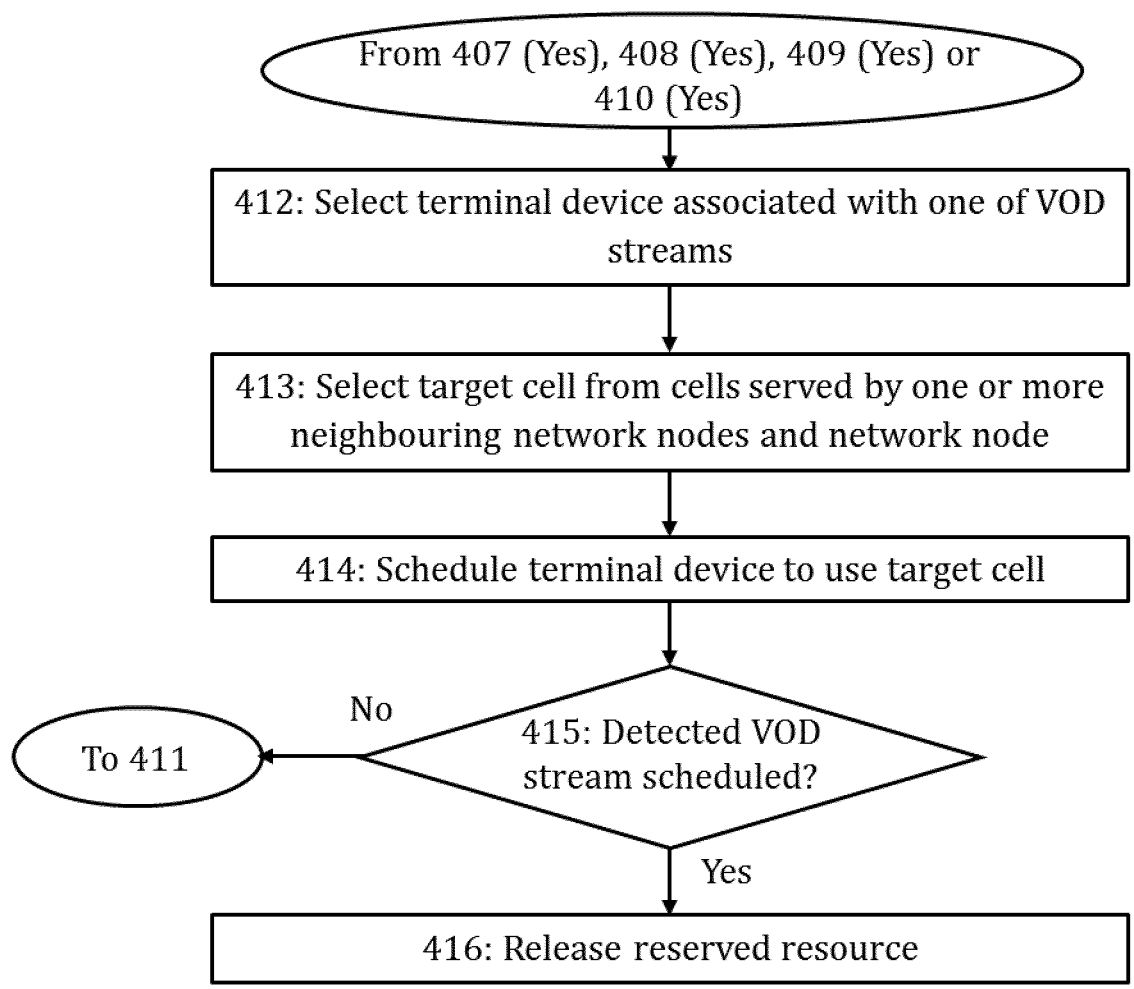

In the embodiment illustrated in FIG. 3, two criteria were used for evaluating the need for rescheduling the VOD stream using another cell, namely the number of the VOD streams handled by the cell associated with the VOD stream and a first traffic load caused by said VOD streams at the source network node. In other embodiments, additional criteria may be defined. FIGS. 4A and 4B illustrate one such embodiment.

Referring to FIGS. 4A and 4B, blocks 401 to 403 may correspond to blocks 301 to 303 of FIG. 3 and will therefore not be repeated here for brevity. In response to the detecting of the VOD stream, the network node reserves, in block 404, a resource for the detected VOD stream. Each reservation may be calculated with a certain pre-defined downlink throughput (e.g., 5 Mbit/s) which is assumed to guarantee certain desired Quality of Experience (QoE) for the end user of the corresponding terminal device. Moreover, blocks 405 and 406 may comprise the actions performed in blocks 304 and 305. However, the network node further determines, in block 405, a second traffic load for at least the cell associated with the detected VOD stream and one or more relative traffic loads for one or more cells, each of which is served by at least one network node of the source network node and the one or more neighbouring network nodes. The one or more relative traffic loads may comprise at least the relative traffic load of the cell associated with the detected VOD stream. The second traffic load may be defined as a traffic load caused by all downlink traffic (both GBR and non-GBR traffic). The relative traffic load for a cell may be defined as the number of active VOD streams in said cell divided by a bandwidth available for VOD streaming at said cell (or by a quantity directly proportional to said bandwidth). Thus, the relative traffic load may provide means for comparing how much of the VOD resources in each cell is utilized at a given moment. The relative traffic loads for the one or more cells served by the one or more neighbouring network nodes may be determined based on the information on the one or more neighbouring network nodes maintained in the database. The network node compares, in block 406, also the second traffic load to a third threshold and the relative traffic load of the cell to each of said one or more relative traffic loads (possibly excluding the relative traffic load of the cell, i.e., the relative traffic load of the cell is not compared to itself). Blocks 407 and 408 relating to the evaluation of the number of the VOD streams and the first traffic load may correspond to blocks 306 and 307 of FIG. 3 with block 412 corresponding to block 308. The process may proceed to block 412 also if the second traffic load of the cell is above a third threshold in block 409 or if the relative traffic load of the cell is above at least one of the one or more relative traffic loads in block 410.

If the number of the VOD streams is equal to or smaller than the first threshold in block 407, the first traffic load is equal to or smaller than the second threshold in block 408, the second traffic load is equal to or smaller than the third threshold in block 409 and the relative traffic load of the cell is equal to or smaller than the one or more relative traffic loads in block 410, the network node schedules, in block 411, the VOD stream in the network node using the cell and the resource reserved for the VOD stream.

The selecting in blocks 412 and 413 and scheduling in block 414 may be performed as described in relation to blocks 308 to 310 of FIG. 3. However, the two new criteria introduced in this embodiments may also be taken into account in the selecting in one or more of blocks 412 and 413. If, after the scheduling, it is determined that the scheduled VOD stream is not the detected VOD stream, the network node sets up, in block 411, the VOD stream in the network node using the cell (i.e., the original cell) using the resource (reserved in block 404). If it is determined that the scheduled VOD stream is the detected VOD stream, the network node releases, in block 415, the resource reserved for the VOD stream in the network node.

In some embodiments, the evaluation of relative traffic loads in block 410 may be performed in an alternative manner. For example, it may be determined whether the relative traffic load of the cell is above at least two of the one or more relative traffic loads or whether the relative traffic load of the cell is above an average of the one or more relative traffic loads. In some embodiments, the relative traffic load of the cell is required to exceed the other relative traffic load(s) by a certain threshold value.

In other embodiments, one or more criteria of blocks 407 to 410 may be included for initiating the selection and scheduling in blocks 308 to 310. Obviously, the determining and the comparing in blocks 405 and 406 may also be limited accordingly. It should be appreciated that the features corresponding any of blocks 404, 411, 415, 416 may be included in or omitted from any of said embodiments.

The information maintained in the database of the network node may comprise a plurality of IP addresses corresponding to one or more VOD service providers. Said plurality of IP addresses may be acquired by the network node, at least in part, by performing the process illustrated in FIG. 5 during the startup of the network node and/or during the operation of the network node.

Figure 5:
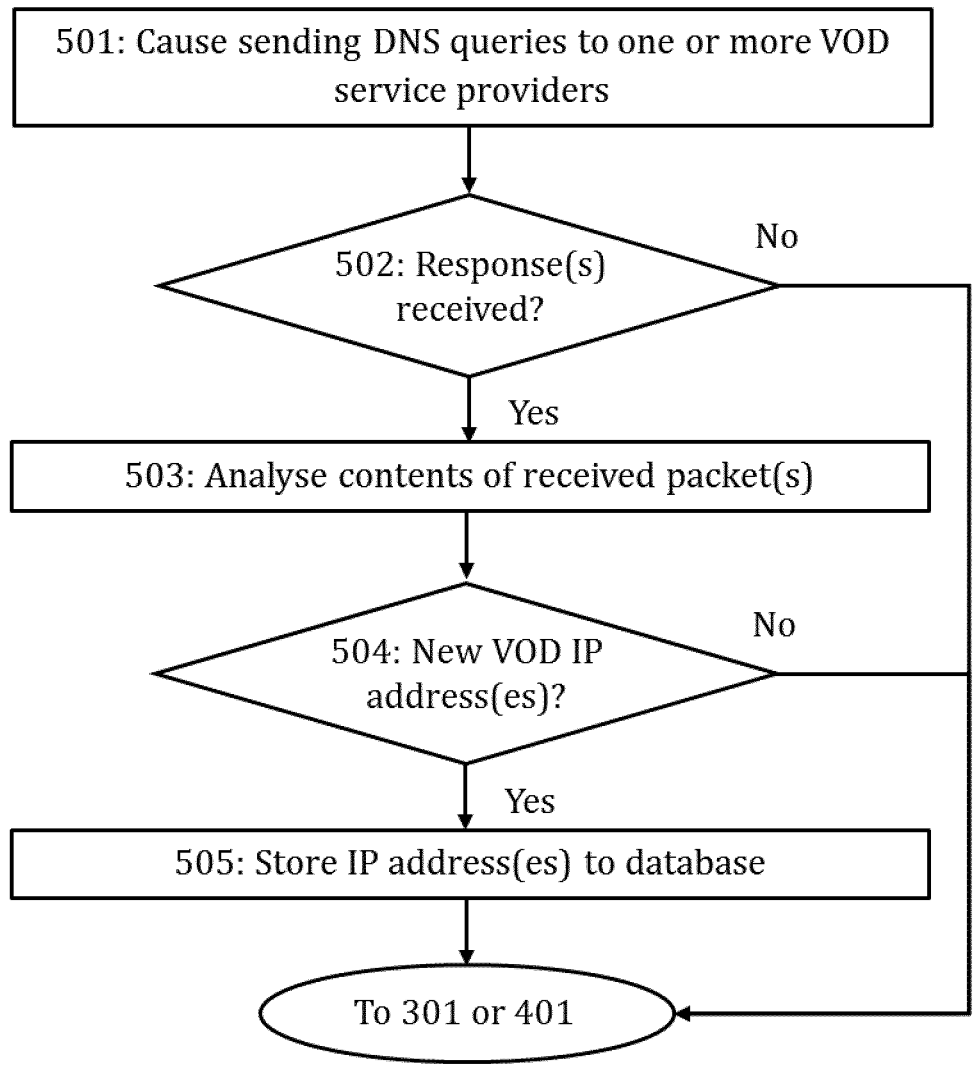

Referring to FIG. 5, the network node causes sending, in block 501, one or more DNS queries to one or more servers of known VOD service providers. Upon receiving the query, each of the one or more servers may query their corresponding DNS server based on the received query. Upon receiving a response message from the DNS server, each of the one or more servers may forward said response message to the network node. Upon receiving one or more response messages from the one or more servers in block 502, the network node analyses, in block 503, the contents of the received one or more response messages. If at least one new IP address (i.e., an IP address not maintained in the database of the network node) is detected from the one or more response messages based on the analysing in block 504, the network node stores, in block 505, the at least one new IP address (being associated with the one or more VOD service providers) to the database of the network node. After the storing, the process may proceed, for example if the process is performed during startup, to block 301 of FIG. 3 or block 401 of FIG. 4.

Figure 6:
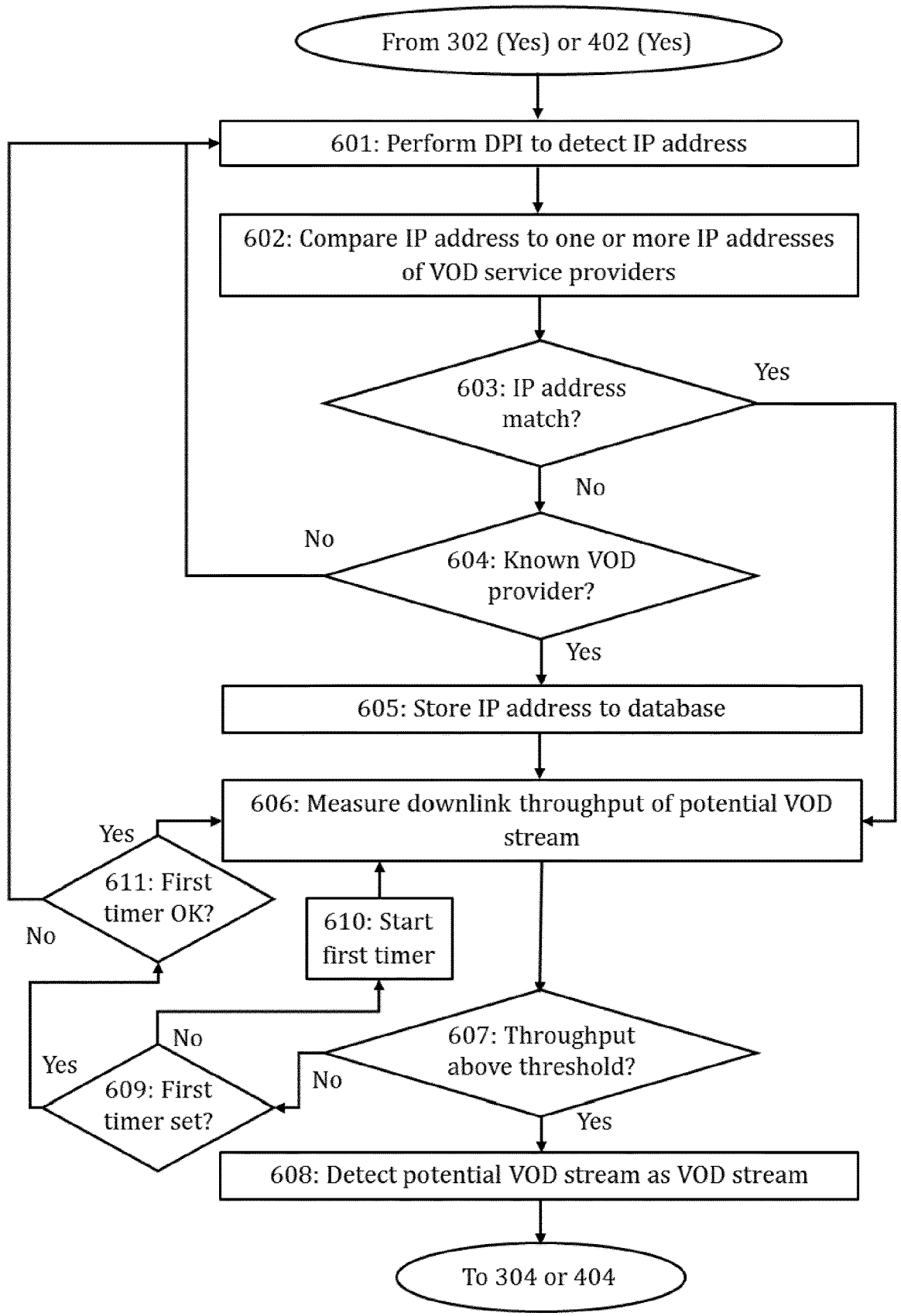

FIG. 6 illustrates an exemplary embodiment for detecting a VOD stream from the downlink traffic received by the network node. The illustrated process may correspond to block 303 of FIG. 3 or block 403 of FIG. 4.

Upon receiving in block 302 or block 402 downlink traffic (i.e., detecting at least one downlink data packet), the network node performs, in block 601, deep packet inspection (DPI) to detect at least an IP address (i.e., a source IP address) from data packets of the downlink traffic. Deep packet inspection (also called complete packet inspection or information extraction) is a data filtering method for inspecting the contents (headers and/or data part) of a data packet. The network node compares, in block 602, the IP address to the one or more IP addresses of the VOD service providers maintained in the database of the network node. If the IP address fails to match an IP address maintained in the database in block 603 but it is detected to belong to a VOD service provider based on the DPI in block 604, the network nodes stores, in block 605, the IP address to the database. If the IP address matches an IP address of the one or more IP addresses in block 603 or following said storing in block 605, the network node measures, in block 606, downlink throughput of a potential VOD stream corresponding to the IP address. The throughput (or network throughput) may be defined as the rate of successful message delivery over a communication channel measured typically in bits per second (bit/s or bps), data packets per second (p/s or pps) or data packets per time slot. If the measured downlink throughput is larger than a fourth threshold, the network node detects, in block 608, the potential VOD stream as the VOD stream. After the detecting in block 608, the process may proceed, for example, to block 304 of FIG. 3 or block 404 of FIG. 4.

If the measured downlink throughput is equal to or smaller than the fourth threshold in block 607, the network node checks, in block 609, if a first time is set (i.e., running). If this is not the case, the network node starts, in block 610, the first timer and repeats the measuring of block 606 as well as throughput check in block 607. If the measured downlink throughput is still equal to or smaller than the fourth threshold in block 607, the timer check in block 609 is repeated. Now, the first timer is already running and thus it is checked whether the first timer has reached a first pre-defined time limit in block 611. If the first pre-defined time limit has been reached, the detection process for the IP address in question is terminated. Otherwise, blocks 606, 607, 609 are repeated until the first pre-defined time limit is reached in block 611 or the measured throughput reaches a value larger than the fourth threshold in block 607.

In some embodiments, the fourth threshold may be defined to have a special zero value in which case the downlink throughput measurement of the VOD stream in block 606 is not performed. In this case, the call is treated as a VOD call (or VOD stream) immediately when it has fulfilled the IP address check in block 603 or blocks 604, 605.

In some embodiments, a second timer may also be defined. Specifically, the second timer for a particular VOD stream may be set (but not started) in response to the detecting in block 608. The second timer may measure the inactivity time of the VOD stream. The network node may start the second timer in response to detecting that no packets are received via the VOD stream or that the downlink throughput of the VOD stream is equal to or smaller than the fourth threshold. The downlink throughput of each VOD stream may be measured periodically by the network node. In response to the second timer reaching a second pre-defined time limit, the network node may release the resource reserved for the VOD stream.

Figure 7A:
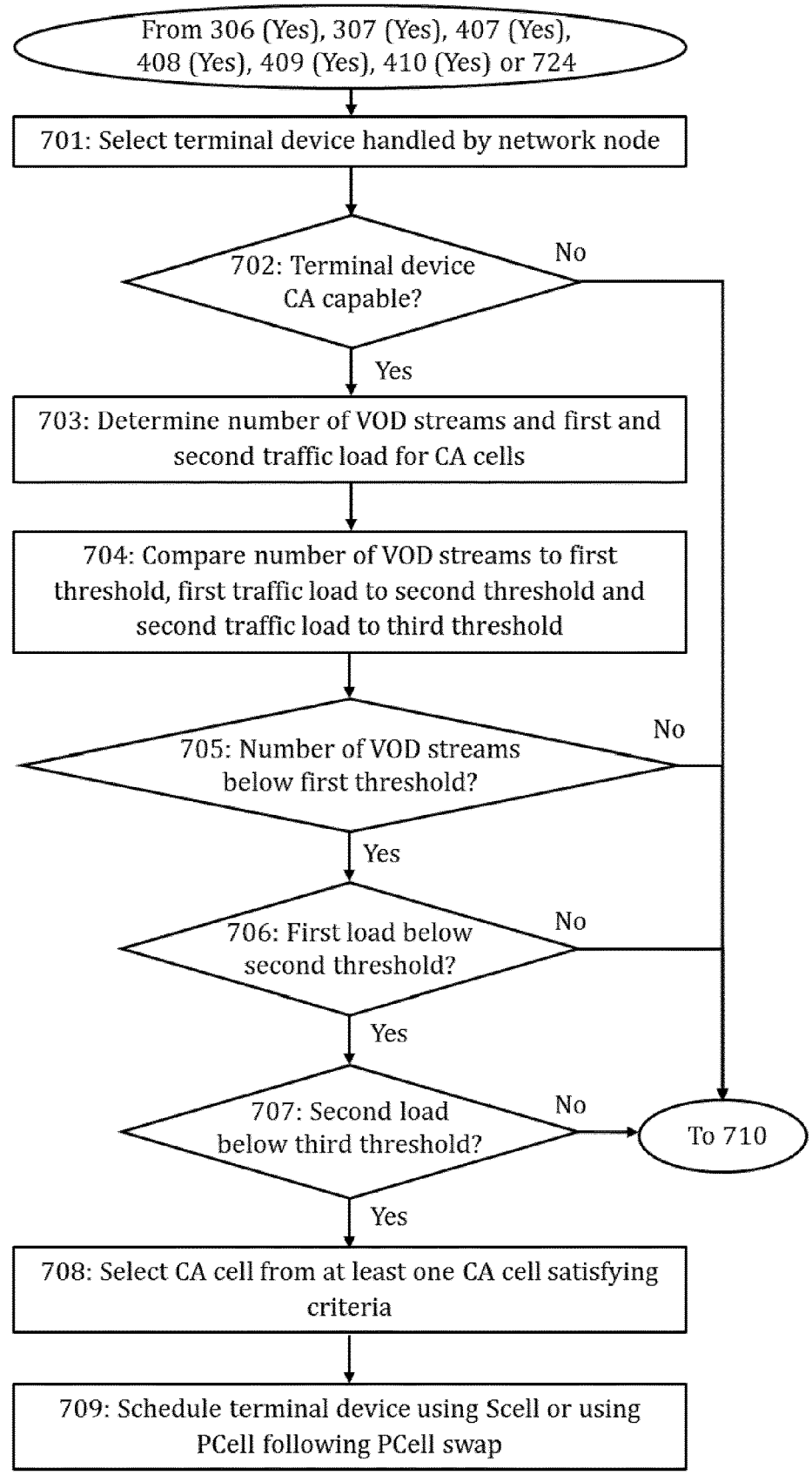
Figure 7B:
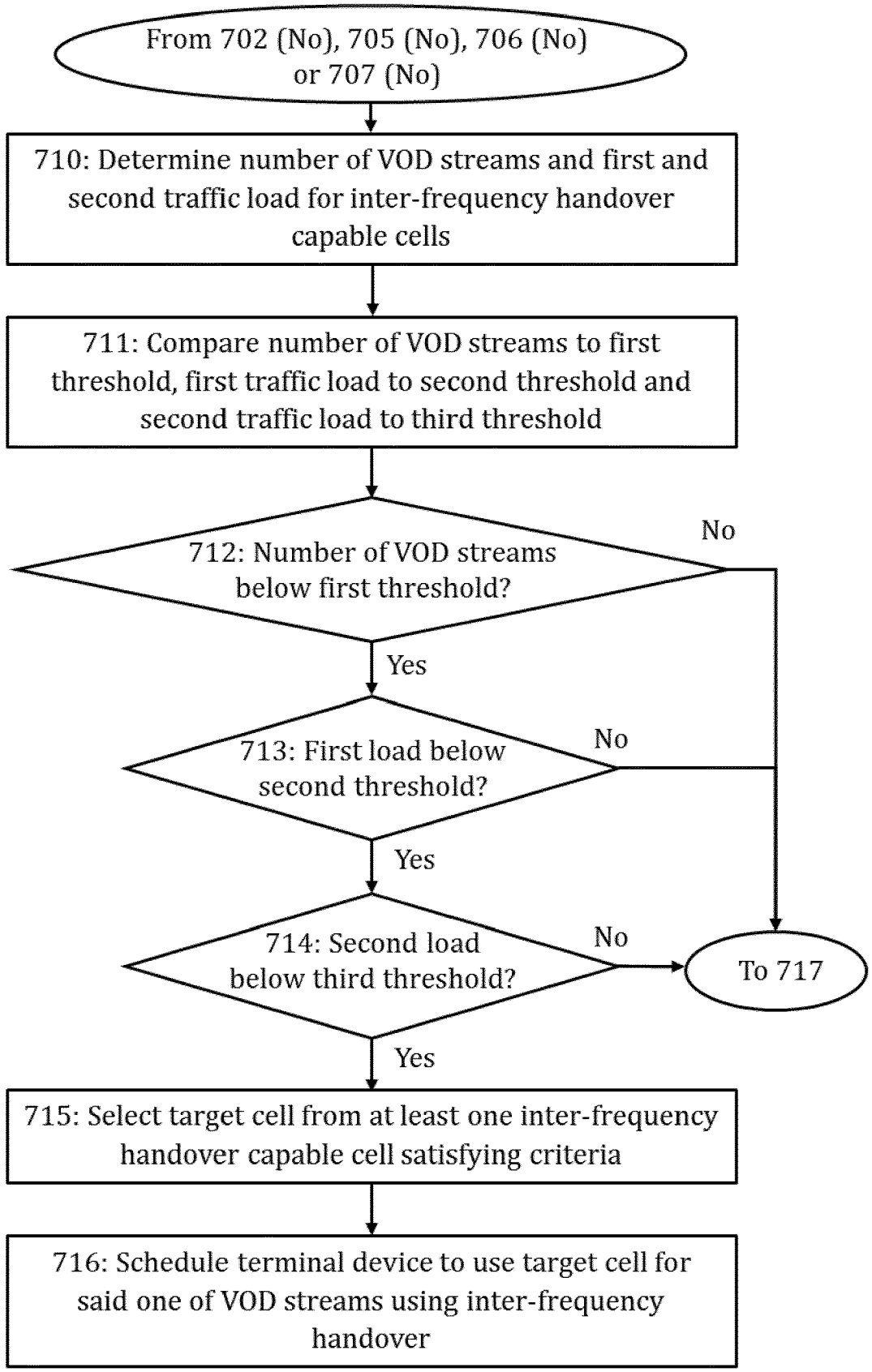
Figure 7C:
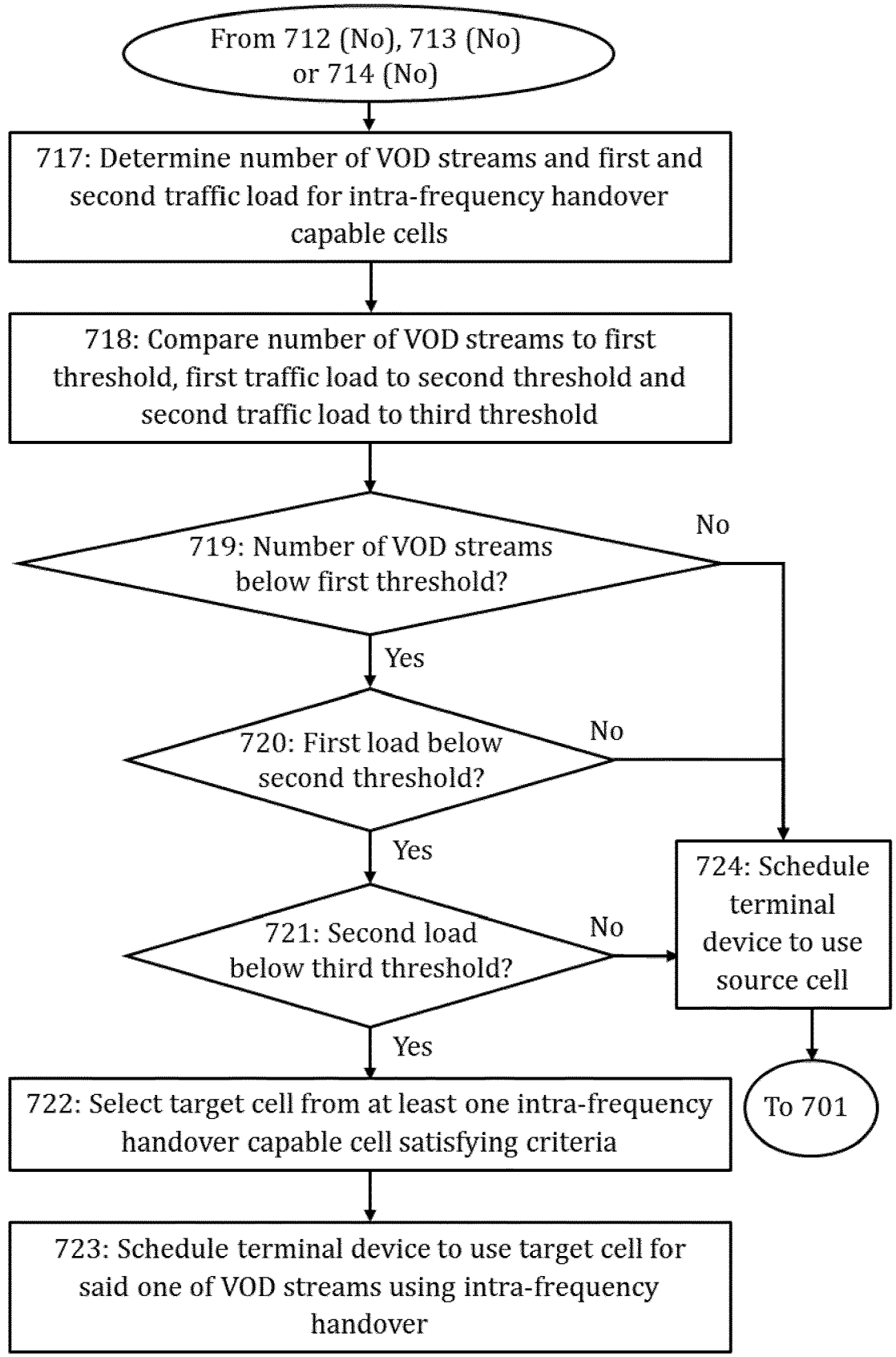

FIGS. 7A, 7B and 7C illustrate a process according to an exemplary embodiment for how the terminal device and the target cell may be selected and scheduled by a network node. The illustrated process may be carried out, for example, by the access node 104 of FIG. 1 and/or the access node 210 of FIG. 2.

After it is determined that the cell meets one or more criteria (e.g., as defined in blocks 306 and 307 or blocks 407 to 410) indicating that the load for the cell of the detected VOD stream is sufficiently large that load equalization should be performed, the network node selects, in block 701, a terminal device in the cell associated with VOD stream for (re)scheduling. The terminal device may be associated with one of the VOD streams or in some embodiments, with none of the VOD streams. The selection of the terminal device (or equivalently a corresponding VOD stream) for a load equalization candidate may be performed by following one or more of the following criteria:

- The terminal device associated with the newest VOD stream (i.e., the VOD stream detected in block 303 of FIG. 3 or block 403 of FIG. 4) is considered as the candidate for VOD load equalization.
- The terminal device associated with an existing VOD stream which is consuming most of the cell's VOD resources (e.g., a terminal device in poor radio conditions or suffering from heavy interference) is considered as the candidate for VOD load equalization.
- The terminal device associated with an existing VOD stream which is consuming most of the cell's resources (including but not limited VOD resources) is considered as the candidate for VOD load equalization.
- The terminal device associated with a VOD stream which is located near the centre of the cell (i.e., likely in good radio conditions) is considered as the candidate for VOD load equalization as it may be assumed that the terminal device will be located in good radio conditions also in inter-frequency neighbour cell on a higher or lower frequency.

In some embodiments, all of above criteria may be available for the selection by the network node and the network node chooses which criterion to use on case-by-case bases. In other embodiments, two or more terminal devices (or corresponding VOD streams) may be selected for (re)scheduling if the load is determined to be distributed very unequally among the cells served by the network node and the neighbouring network node(s) (e.g., when comparing the relative traffic loads in block 406 of FIG. 4).

After the selection of the terminal device candidate as a candidate for VOD load equalization in block 701, it is determined whether the terminal device is capable of carrier aggregation in block 702. If the terminal device is capable of carrier aggregation, the network node, first, attempts to schedule the terminal device on downlink using another cell of the network node capable of carrier aggregation in blocks 703 to 709. In order to select the target cell, the network node performs evaluation of the one or more secondary cells of the network node in a manner similar to the evaluation of the source cell (assumed here to be a primary cell) in blocks 405 to 409 of FIG. 4. Namely, the network node determines, in block 703, at least the number of VOD streams handled by each secondary cell served by the network node for the selected terminal device and corresponding first and second traffic loads. Then, the network node compares, in block 704, the number of the VOD streams in each secondary cell to the first threshold, the first traffic loads to the second threshold and the second traffic loads to the third threshold. The first and second traffic loads and the first, second and third thresholds may be defined as described in relation to previous embodiments.

If at least one secondary cell satisfies the criteria:
- the number of VOD streams handled by the target cell is below the first threshold in block 705,
- a first traffic load caused by the VOD streams handled by the target cell is below the second threshold in block 706 and a second traffic load of the target cell is below the third threshold in block 707, the network node selects, in block 708, one of the at least one secondary cell as the target cell. If more than one secondary cell satisfies the above criteria, the selection between said two or more cells may be based on the number of the VOD streams handled by each of the two or more cells and/or the values of the first traffic load and/or the second traffic load for each of the two or more cells. For example, the target cell may be the cell (out of the two or more cells) for which the number of VOD streams is the smallest.

After the carrier aggregation capable terminal device and the target cell are selected, the network node may perform the scheduling, in block 709, in two alternative ways utilizing carrier aggregation. Specifically, the scheduling utilizes the concepts of primary cell (primary serving cell) and secondary cell (or secondary serving cell) as described in relation to FIG. 2. According to the first alternative, the network node schedules, in block 709, the terminal device using the target cell acting as a secondary cell. According to the second alternative, the network node, first, causes swapping, in block 709, a primary cell served by the network node with the secondary cell corresponding to the target cell. Second, the network node schedules, in block 709, the terminal device using the target cell which is now acting as the primary cell.

In some embodiments, the network node may attempt to schedule the terminal device on downlink using another cell of the network node capable of carrier aggregation or using a neighbouring cell served by one of the one or more neighbouring network nodes capable of carrier aggregation with the network node. The process may be similar, also in this case, to the one illustrated in blocks 703 to 709

If the selected terminal device is not capable of carrier aggregation in block 702 or if the selected terminal device is capable of carrier aggregation in block 702 but none of the secondary cells of carrier aggregation (if any exist) satisfy the criteria defined in blocks 705 to 707, the network node has to rely on inter-frequency and intra-frequency handovers between the source cell of network node and cell(s) of the one or more neighbouring network nodes and/or other cell(s) of the network node for the scheduling instead of utilizing carrier aggregation. In intra-frequency handover, the terminal device remains on the same frequency channel when moving to another cell while in inter-frequency handover, the terminal device moves to a different frequency channel when moving to another cell. In the illustrated exemplary embodiment, inter-frequency handovers are prioritized by the network node in the selection and scheduling over the intra-frequency handovers. Thus, the network node, first, performs evaluation processes in blocks 710 to 712 and if necessary blocks 713 and/or 714 for one or more cells of the source network node and one or more neighbouring network nodes capable of inter-frequency handovers with the source cell. Apart from the cells for which the processes are performed being different, the processes in blocks 710 to 714 may be similar to the processes performed in blocks 703 to 706 and are thus not repeated here for brevity. If at least one inter-frequency handover capable cell served by at least one of the one or more neighbouring network nodes and the network node satisfies the criteria in blocks 712 to 714, the network node selects, in block 715, one of the at least one inter-frequency handover capable cells as the target cells. If at least two inter-frequency handover capable cells satisfy the criteria in blocks 712 to 714, the selection of the target cell from said at least two inter-frequency handover capable network nodes may be performed as described in relation to block 708. The network node schedules, in block 716, the terminal device to use the target cell for a corresponding VOD stream using inter-frequency handover between the (source) network node and the target cell.

If none of the inter-frequency handover capable cells (if any exist) satisfy the criteria defined in blocks 712 to 714, the last option left for the network node in the illustrated exemplary process is to look for a cell capable of intra-frequency handovers which satisfies the criteria regarding number of VOD streams and traffic loads. The processes carried out by the network node in blocks 717 to 722 may correspond to the processes in blocks 703 to 708 and/or 710 to 715, only difference being that intra-frequency handover capable cells (neighbouring cell(s) and/or possible other cell(s) of the network node) are considered in blocks 717 to 722 (instead of carrier aggregation capable or inter-frequency handover capable cells as in blocks 703 to 708 and 710 to 715). After the selecting in block 722, the network node schedules, in block 723, the terminal device to use the target cell for a corresponding VOD stream using intra-frequency handover between the (source) network node and the target cell.

If none of the intra-frequency handover capable network nodes (if any exist) satisfy the criteria defined in blocks 719 to 721, the network node schedules, in block 724, the VOD stream in the network node using the cell (i.e., the original cell associated with the VOD stream) using the resource reserved for the VOD stream. In this case, the process of FIG. 7 may be repeated periodically in order to still attempt to schedule the terminal device to use one of the other cells available.

In other embodiments, one or more of the criteria in blocks 705 to 707, 712 to 714 and 719 to 721 may be omitted. The corresponding determining and comparing processes may also be modified accordingly. For example, if the second traffic load is not part of the criteria for the selection of the secondary cell of carrier aggregation (i.e., block 707 is omitted), the (sub)processes of the detecting of the second traffic load in block 703 and the comparing of the second traffic load to the third threshold in block 704 may also be omitted. While in the illustrated exemplary embodiment, scheduling using carrier aggregation was prioritized over inter- and intra-frequency handovers and inter-frequency handovers were prioritized over intra-frequency handovers, other prioritization may be in other embodiments. Moreover, evaluation of one or more of the three categories of cells (carrier aggregation capable and inter- and intra-frequency handover capable) may be omitted altogether in some embodiments.

The terminal device selected in block 701 of FIG. 7 may in some cases be a terminal device which is not associated with any VOD streams. This may occur, for example, if the selecting of the terminal device is based on selecting the terminal device of the one or more terminal devices consuming the largest amount of total resources in the cell. In this case, an alternative process may be used for scheduling said terminal device. One example of such an alternative process according to an embodiment is illustrated in FIG. 8.

Figure 8:
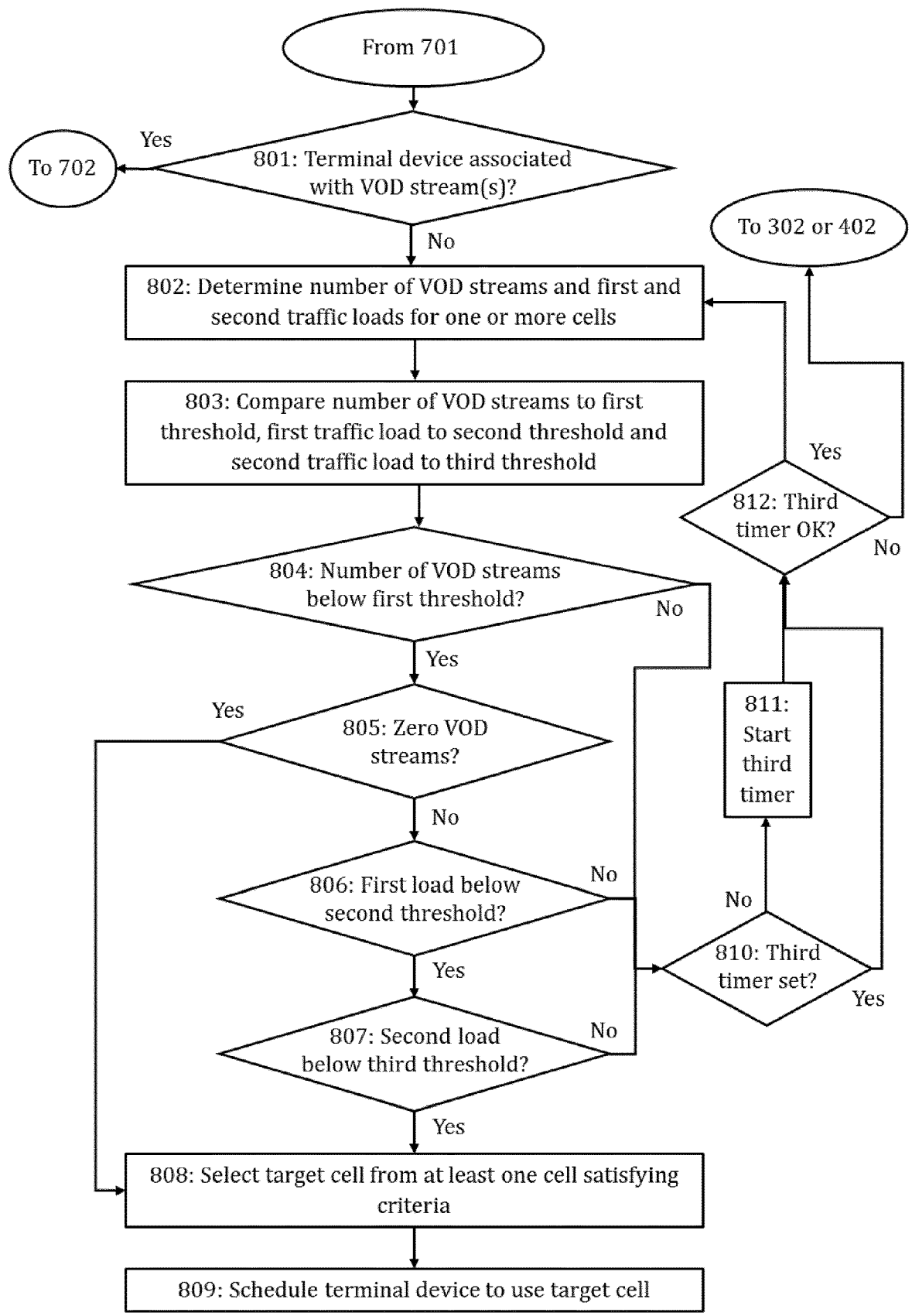

Referring to FIG. 8, the selecting of a terminal device for (re)scheduling may be performed as discussed in relation to block 701 of FIG. 7. If it is determined thereafter that the selected terminal device is associated with at least one VOD stream, the process may proceed to block 702 of FIG. 7. However, if it is determined that the selected terminal device is not associated with any VOD streams in block 801, the network node determines, in block 802, the number of VOD streams and the first and second traffic loads for the one or more cells (each served by at least one of the network node and the one or more neighbouring network node) and compares, in block 803, each of the number of the VOD streams to the first threshold, the first traffic loads to the second threshold and the second traffic loads to the third threshold, similar to as was discussed in relation to earlier embodiments. If the number of VOD streams is determined to be below the first threshold for at least one cell in block 804, it is further determined, in block 805, whether the number of VOD streams for any of said at least one cell is zero (acting as a primary criterion for the target cell selection in this case). If this is the case, the network node selects, in block 808, one of at least one cell handling zero VOD streams as a target cell and schedules, in block 809, the terminal device to use the target cell. If none of the neighbouring network nodes satisfy the primary criterion defined in block 805, it is further determined whether any of the cell(s) satisfying criterion of block 804 also satisfy criteria set in both of blocks 806 and 807 (considered together as a secondary criterion in this embodiment). Namely, it is determined whether the first traffic load for the cell is below the second threshold in block 806 and the second traffic load for the cell is below the third threshold in block 807. If at least one cell satisfying the criteria defined in all of blocks 805, 806 and 807 exists, the network node selects, in block 808, one of said at least one cell as a target cell and schedules, in block 809, the terminal device to use the target cell.

If it is determined in any of blocks 804, 806 and 807 that the corresponding criterion cannot be satisfied by any available cell (that is, no suitable target cell can be found), it is determined whether a third timer has been set (that is, defined and running) in block 810 and if the third timer has not been set, the network node starts, in block 811, the third timer. While the third timer is running, the process for finding a target cell (i.e., blocks 802 to 807) is repeated. After each repetition, it is checked whether the third timer has reached a third pre-defined time limit. If the third pre-defined time limit has not been reached, the process for finding a target cell is again repeated. If the third pre-defined time limit has been reached, the network node stops searching for a target cell for the selected terminal device and the process proceeds back to block 302 or 402.

In some embodiments, different first, second and third thresholds may be defined for use in some of the processes of FIGS. 7A, 7B, 7C and/or 8.

In some embodiments, when a terminal device is moved to a new cell due to VOD equalization (i.e., scheduled using a new target cell) according any earlier embodiment, said terminal device may be granted with an increased number of resources for a pre-defined amount of time (e.g., a few seconds) in order to recover from poor throughput faster.

In some embodiments, VOD load equalization process (or function) according to any of previous embodiments may be initiated after a certain number of VOD calls have been established in the cell (e.g., two VOD calls) or after a VOD load of at least one cell has exceeded a pre-defined soft threshold. Said VOD load may be defined, for example, as a first or second traffic load according to any definition given above.

The blocks, related functions, and information exchanges described above by means of FIGS. 3 to 8 are in no absolute chronological order, and some of them may be performed simultaneously or in an order differing from the given one.

Figure 9:
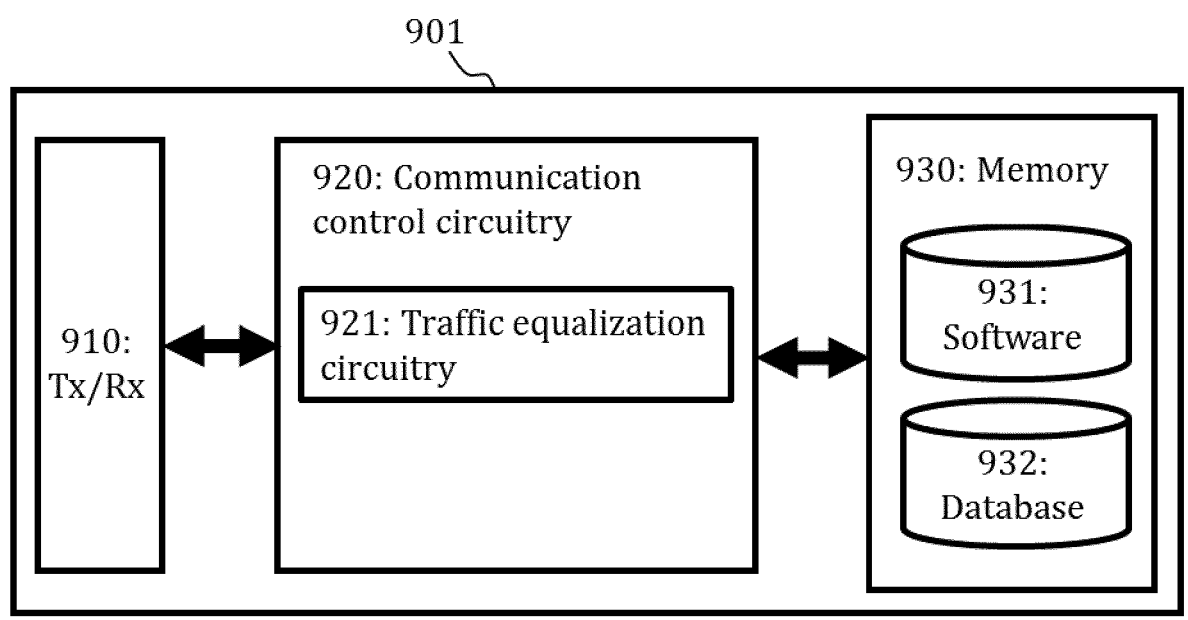
FIG. 9 illustrates an exemplary apparatus according to an embodiment.

FIG. 9 illustrates an exemplary apparatus 901 configured to carry out the functions described above in connection with the access node 104 (or network node) of FIG. 1 and/or the access node 210 (or network node) of FIG. 2. The apparatus may be an electronic device comprising electronic circuitries. The apparatus may be a separate network entity or a plurality of separate entities. The apparatus may comprise a communication control circuitry 910 such as at least one processor, and at least one memory 930 including a computer program code (software) 931 wherein the at least one memory and the computer program code (software) are configured, with the at least one processor, to cause the apparatus to carry out any one of the embodiments of the portable apparatus described above.

The memory 930 may be implemented using any suitable data storage technology, such as semiconductor based memory devices, flash memory, magnetic memory devices and systems, optical memory devices and systems, fixed memory and removable memory. The memory may comprise a database 932 which may be or comprise the database as described in relation to previous embodiments. The database 932 may comprise, for example, information on VOD streams handled by the apparatus (i.e., a network node), information on one or more neighbouring network nodes and/or information on one or more IP addresses associated with one or more VOD service providers. The memory 930 may be connected to the communication control circuitry 920 via an interface.

The apparatus may further comprise a communication interface (Tx/Rx) 910 comprising hardware and/or software for realizing communication connectivity according to one or more communication protocols. The communication interface may provide the apparatus with communication capabilities to communicate in the cellular communication system and enable communication with network nodes and terminal devices, for example. The communication interface (Tx/Rx) 910 may comprise, for example, interfaces enabling the connections between the access node and other network entities as described in relation to FIG. 1 and/or FIG. 2. The communication interface 910 may comprise standard well-known components such as an amplifier, filter, frequency-converter, (de)modulator, and encoder/decoder circuitries and one or more antennas.

Referring to FIG. 9, the communication control circuitry 920 may comprise traffic equalization circuitry 921 configured to perform the VOD load equalization. The traffic equalization circuitry 921 may be configured to carry out at least some of the processes illustrated in any of FIGS. 3 to 8.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device In an embodiment, at least some of the processes described in connection with FIGS. 3 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 8 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor.

In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A network node, comprising:
    at least one processor; and
    at least one memory including computer program code, the at least one memory and computer program code configured to, with the at least one processor, cause the network node to perform:
    maintaining in a database information on a plurality of Video On Demand, VOD, streams handled by the network node and information on one or more neighbouring network nodes;
    receiving downlink traffic to be transmitted to one or more terminal devices served by the network node;
    detecting, from the downlink traffic, a VOD stream to be transmitted to a terminal device in a cell served by the network node;
    reserving, in response to the detecting of the VOD stream, a resource for the VOD stream;
    determining the number of VOD streams handled by the cell including the detected VOD stream and a first traffic load caused by the VOD streams;
    comparing the number of the VOD streams to a first threshold and the first traffic load caused by the VOD streams to a second threshold;
    in response to the number of the VOD streams being above the first threshold or the first traffic load caused by the VOD streams being above the second threshold, performing the following:
        selecting a terminal device associated with one of the VOD streams, wherein said terminal device associated with said one of the VOD streams is selected to be one of
        a terminal device associated with the VOD stream,
        a terminal device of the one or more terminal devices consuming the largest amount of resources from resources available for VOD streaming in the cell,
        a terminal device of the one or more terminal devices consuming the largest amount of total resources in the cell and
        a terminal device of the one or more terminal devices located closest to a center of the cell,
        selecting a target cell from one or more cells served by at least one of the one or more neighbouring network nodes and the network node, and
        scheduling said terminal device associated with said one of the VOD streams to use the target cell for said one of the VOD streams; and
    in response to the number of the VOD streams being equal to or smaller than the first threshold and the traffic load caused by the VOD streams being equal to or smaller than the second threshold, scheduling the VOD stream in the network node using the cell and the resource reserved for the VOD stream, wherein the first traffic load is a traffic load caused by VOD streaming with a non-guaranteed bit rate, the at least one memory and the computer code being further configured to cause the network node to perform:
    determining a second traffic load of the cell caused by all downlink traffic and one or more relative traffic loads of the one or more cells, wherein the relative traffic load is defined as the number of active VOD streams divided by a bandwidth available for VOD streaming in a corresponding cell;
    comparing the second traffic load to a third threshold and the relative traffic load of the cell to each of the one or more relative traffic loads;
    performing the selecting of the terminal device, the selecting of the target cell and the scheduling of the terminal device also in response to the second traffic load being above the third threshold or in response to the relative traffic load of the cell being above at least one of the one or more relative traffic loads; and
    performing the scheduling the VOD stream in the network node using the cell and the resource reserved for the VOD stream only in response to also the second traffic load being equal to or below the third threshold and the relative traffic load being equal to or below the one or more relative traffic loads.

2. The network node according to claim 1, wherein the at least one memory and the computer code are further configured to cause the network node to perform:
    in response to the scheduling of the terminal device to use the target cell for said one of the VOD streams, if said one of the VOD streams is the VOD stream, releasing the resource reserved for the VOD stream in the network node, otherwise, scheduling the VOD stream in the network node using the cell and the resource reserved for the VOD stream.

3. The network node according to claim 1, wherein the selecting of the target cell comprises:
determining the number of VOD streams associated with each cell of the one or more cells, a first traffic load of each cell of the one or more cells and a second traffic load of each cell of the one or more cells;
comparing the number of the VOD streams handled by each of the one or more cells to the first threshold, the first traffic loads to the second threshold and the second traffic loads to the third threshold; and
selecting the target cell for the scheduling of the terminal device based on the target cell satisfying one or more criteria comprising:
the number of VOD streams handled by the target cell is below the first threshold;
a first traffic load caused by the VOD streams handled by the target cell is below the second threshold; and
a second traffic load of the target cell is below the third threshold.

4. The network node according to claim 3, wherein the at least one memory and the computer code are further configured to cause the network node to perform:
in response to determining that the terminal device selected for the scheduling is associated with zero VOD streams, performing the selecting of the target cell for the scheduling of the terminal device based on the target cell satisfying a primary criterion or if none of the one or more cells satisfy the primary criterion, based on the target cell satisfying a secondary criterion, wherein the primary criterion demands that the number of VOD streams handled by the target cell is zero and the secondary criterion demands that the number of VOD streams handled by the target cell is below the first threshold, a first traffic load caused by the VOD streams handled by the target cell is below the second threshold and a second traffic load of the target cell is below the third threshold.

5. The network node according to claim 1, wherein the at least one memory and the computer code are further configured to cause the network node to perform, after the selecting of the terminal device:
in response to the terminal device being capable of carrier aggregation, determining whether one or more secondary cells of carrier aggregation are available for the scheduling in the network node and in response to the one or more secondary cells being available, performing the selecting of the target cell only from the one or more secondary cells; and
in response to the terminal device being incapable of carrier aggregation or the terminal device being capable of carrier aggregation but no secondary cells of carrier aggregation satisfying the one or more criteria being determined to be available, performing the selecting of the target cell by prioritizing target cells capable of inter-frequency handover and satisfying the one or more criteria over target cells capable of only intra-frequency handover and satisfying the one or more criteria.

6. The network node according to claim 5, wherein the scheduling of the terminal device using the target cell comprises:
in response to the terminal device being capable of carrier aggregation and the one or more secondary cells satisfying the one or more criteria being to be available, scheduling the terminal device using the target cell acting as a secondary cell, SCell, served by the network node or causing swapping a primary cell, PCell, served by the network node with the secondary cell target cell and performing the scheduling using the primary cell; and
in response to the terminal device being incapable of carrier aggregation or the terminal device being capable of carrier aggregation but no carrier aggregation capable network node being determined to be available, if the target cell is capable of inter-frequency handover, scheduling the terminal device using inter-frequency handover between the cell and the target cell, otherwise, scheduling the terminal device using intra-frequency handover between the cell and the target cell.

7. The network node according to claim 1, wherein the at least one memory and the computer code are further configured to cause the network node to perform:
maintaining in the database information on one or more Internet Protocol, IP, addresses associated with the one or more VOD service providers, the detecting of the VOD stream comprising:
performing deep packet inspection to detect an IP address from data packets of the downlink traffic;
comparing the IP address to the one or more IP addresses of the VOD service providers;
in response to the IP address matching an IP address of the one or more IP addresses maintained in the database, measuring downlink throughput of a potential VOD stream corresponding to the IP address; and
in response to the measured downlink throughput being larger than a fourth threshold, detecting the potential VOD stream as the VOD stream.

8. The network node according to claim 7, wherein the at least one memory and the computer code are further configured to cause the network node to perform:
in response to, after the comparing, the IP address failing to match an IP address maintained in the database but the IP address being detected to belong to a VOD service provider based on the deep packet inspection, storing the IP address to the database;
measuring downlink throughput of a potential VOD stream corresponding to the IP address; and
in response to the measured downlink throughput being larger than the fourth threshold, detecting the potential VOD stream as the VOD stream.

9. The network node according to claim 7, wherein the means are further configured to perform:
in response to the measured downlink throughput being equal to or smaller than the fourth threshold, starting a first timer;
measuring the downlink throughput of the potential VOD stream; and
in response to a value of the downlink throughput larger than the fourth threshold being measured before the first timer reaches a first pre-defined time limit, detecting the potential VOD stream as the VOD stream.

10. The network node according to claim 7, wherein the at least one memory and the computer code are further configured to cause the network node to perform:
in response to detecting that no packets are received via the VOD stream or that the downlink throughput of the VOD stream is equal to or smaller than the fourth threshold, starting a second timer; and
in response to the second timer reaching a second pre-defined time limit, releasing the resource reserved for the VOD stream.

11. The network node according to claim 7, wherein the at least one memory and the computer code are further configured to cause the network node to perform:

causing sending one or more Domain Name System, DNS, queries to one or more servers of the VOD service providers; and in response to receiving one or more response messages from the one or more servers, analysing contents of the one or more response messages and in response to detecting at least one IP address not maintained in the database based on the analysing, storing the at least one IP address to the database.

12. A network node, comprising:

at least one processor; and at least one memory including computer program code, the at least one memory and computer program code configured to, with the at least one processor, cause the network node to perform:

maintaining in a database information on a plurality of Video On Demand, VOD, streams handled by the network node and information on one or more neighbouring network nodes;

receiving downlink traffic to be transmitted to one or more terminal devices served by the network node;

detecting, from the downlink traffic, a VOD stream to be transmitted to a terminal device in a cell served by the network node;

reserving, in response to the detecting of the VOD stream, a resource for the VOD stream;

determining the number of VOD streams handled by the cell including the detected VOD stream and a first traffic load caused by the VOD streams;

comparing the number of the VOD streams to a first threshold and the first traffic load caused by the VOD streams to a second threshold;

in response to the number of the VOD streams being above the first threshold or the first traffic load caused by the VOD streams being above the second threshold, performing the following:

selecting a terminal device associated with one of the VOD streams, wherein said terminal device associated with said one of the VOD streams is selected to be one of a terminal device associated with the VOD stream, a terminal device of the one or more terminal devices consuming the largest amount of resources from resources available for VOD streaming in the cell, a terminal device of the one or more terminal devices consuming the largest amount of total resources in the cell and a terminal device of the one or more terminal devices located closest to a center of the cell, selecting a target cell from one or more cells served by at least one of the one or more neighbouring network nodes and the network node, and scheduling said terminal device associated with said one of the VOD streams to use the target cell for said one of the VOD streams; and in response to the number of the VOD streams being equal to or smaller than the first threshold and the traffic load caused by the VOD streams being equal to or smaller than the second threshold, scheduling the VOD stream in the network node using the cell and the resource reserved for the VOD stream, wherein the at least one memory and the computer code are further configured to cause the network node to perform:

maintaining in the database information on one or more Internet Protocol, IP, addresses associated with the one or more VOD service providers, the detecting of the VOD stream comprising:

performing deep packet inspection to detect an IP address from data packets of the downlink traffic;

comparing the IP address to the one or more IP addresses of the VOD service providers;

in response to the IP address matching an IP address of the one or more IP addresses maintained in the database, measuring downlink throughput of a potential VOD stream corresponding to the IP address; and in response to the measured downlink throughput being larger than a fourth threshold, detecting the potential VOD stream as the VOD stream, wherein the at least one memory and the computer code are further configured to cause the network node to perform:

in response to detecting that no packets are received via the VOD stream or that the downlink throughput of the VOD stream is equal to or smaller than the fourth threshold, starting a second timer; and in response to the second timer reaching a second predefined time limit, releasing the resource reserved for the VOD stream.

\* \* \* \* \*